Nov. 9, 1954 J. K. MILLS 2,694,106

RINGING CURRENT SUPPLY SYSTEM

Filed March 22, 1951 4 Sheets-Sheet 1

INVENTOR
J. K. MILLS
BY
G. F. Kane
ATTORNEY

Nov. 9, 1954 J. K. MILLS 2,694,106

RINGING CURRENT SUPPLY SYSTEM

Filed March 22, 1951 4 Sheets-Sheet 2

INVENTOR
J. K. MILLS
BY A. F. Kane
ATTORNEY

Nov. 9, 1954 J. K. MILLS 2,694,106
RINGING CURRENT SUPPLY SYSTEM
Filed March 22, 1951 4 Sheets-Sheet 3

INVENTOR
J. K. MILLS
BY
A. F. Kane
ATTORNEY

Nov. 9, 1954 J. K. MILLS 2,694,106

RINGING CURRENT SUPPLY SYSTEM

Filed March 22, 1951 4 Sheets-Sheet 4

INVENTOR
J. K. MILLS
BY G. F. Kane
ATTORNEY 2,694,106

RINGING CURRENT SUPPLY SYSTEM

John K. Mills, Morristown, N. J., assignor to Bell Telephone Laboratories, Incorporated, New York, N. Y., a corporation of New York Application March 22, 1951, Serial No. 216,957

6 Claims. (Cl. 179—84)

Figure 1:
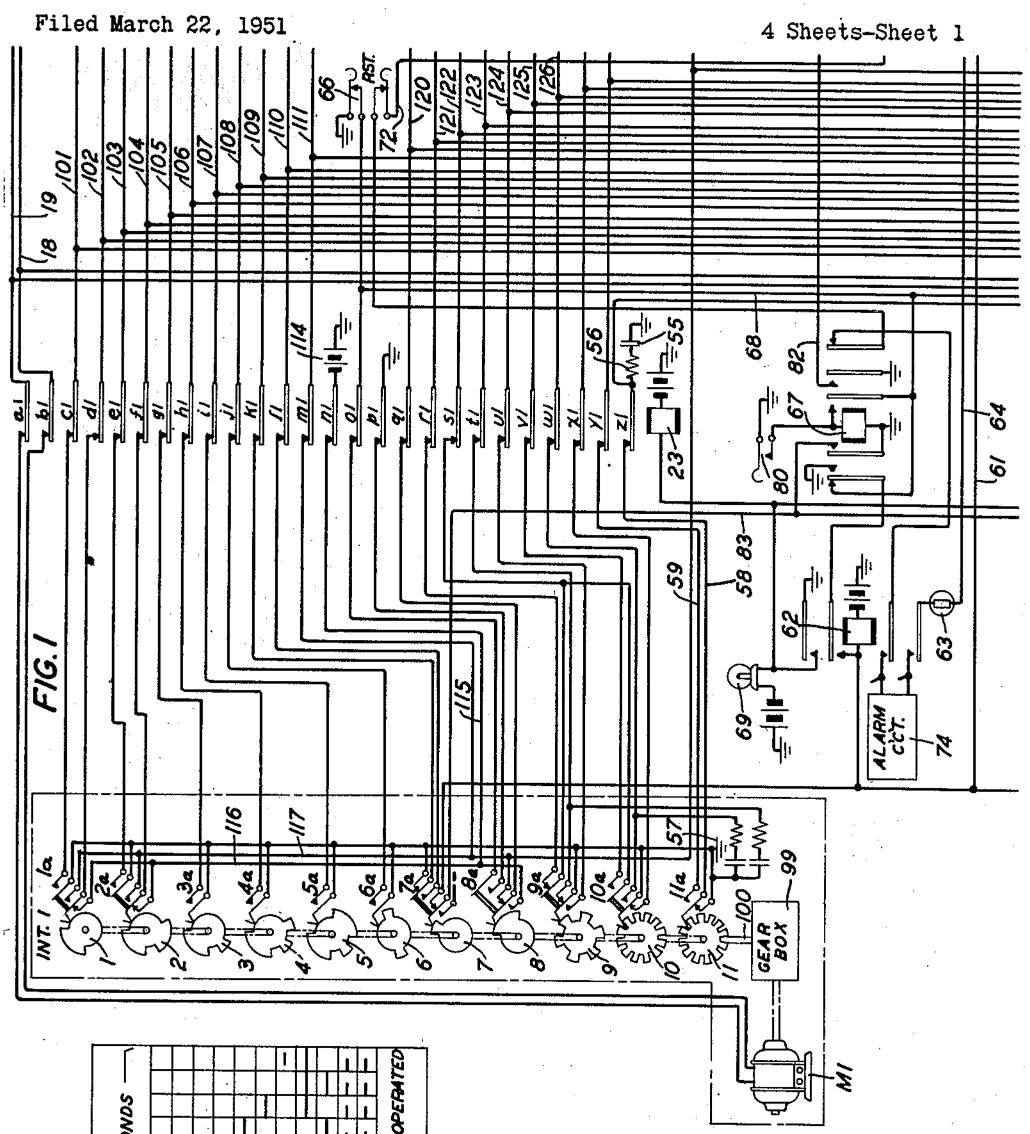

This invention relates to power supply systems for telephone exchanges and more particularly to telephone ringing systems involving ringing current and tone generators and duplicate interrupters.

Systems of the general character to which this invention relates find extensive use in the telephone plant and function particularly to furnish ringing current at voltages required by the telephone exchange; interrupted ringing current and ground potential at proper intervals for furnishing code signals for multiparty selective and/or semiselective ringing; interrupted ground potential for signaling; and tone and other signal sources required by the telephone exchange. A system of this general type is disclosed in United States Patent 2,225, 907, issued December 24, 1940, to Duguid, Ross and Van Duyne.

In systems of the character described and as disclosed in the above-identified patent, duplicate ringing equipment involving interrupters is employed so that the load normally supplied by one equipment may be manually, for maintenance purposes, or automatically, in an emergency, transferred to the standby, or spare equipment, thus insuring against failure of the ringing and signaling current supply. Heretofore, the only conditions of emergency that were provided for were those identified with a failure of the local service supply or of the ringing current output. That is, transfer of the load from one equipment to another when not undertaken deliberately and manually was effected automatically only when the local service or the ringing current output failed.

It is the object of this invention to simplify and otherwise improve code ringing supply systems involving rotating interrupter mechanisms to the extent that a condition of emergency is recognized not only upon failure of the local service mains and of the ringing current output, but also when a trouble condition, other than a power failure, is encountered by the interrupter mechanism per se.

This object is attained in accordance with a feature of the invention by the provision of switching means which functions under direct control of a rotating element of the interrupter mechanism to effect the transfer of the exchange load from a regular interrupter to a spare interrupter whenever the regular interrupter fails to rotate for any reason whatsoever.

Specifically, the invention contemplates the use of slow releasing interrupter-transfer control means which, during normal operation of the regular or primary interrupter is maintained operated by condenser charges controlled by a spring pile-up operated at a predetermined rate by one of the cams of the regular interrupter and which, incident to a stoppage of the interrupter for any reason whatsoever, releases to effect the automatic transfer of the exchange load to a spare interrupter and to start the spare interrupter operating.

Figure 5:
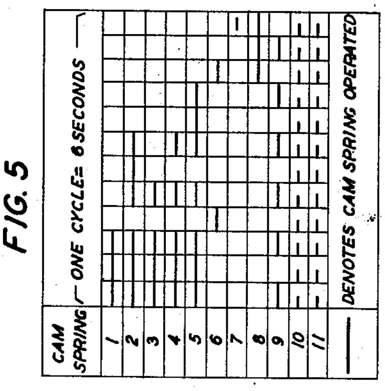
Figure 6:
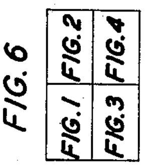

This and other features of the invention will be better understood from the following detailed description when read with reference to the accompanying drawings in which:

Figs. 1, 2, 3 and 4 when relatively disposed in the manner indicated by Fig. 6 comprise a diagrammatic representation of the circuits and apparatus involved in the ringing current supply system of the present invention; and Fig. 5 is a chart showing the closed and open intervals of the spring pile-ups controlled by cams 1 to 11, inclusive of, interrupters INT1 and INT2 during one complete revolution of their respective shafts, such as shaft 100 of interrupter INT1, Fig. 1.

Figure 2:
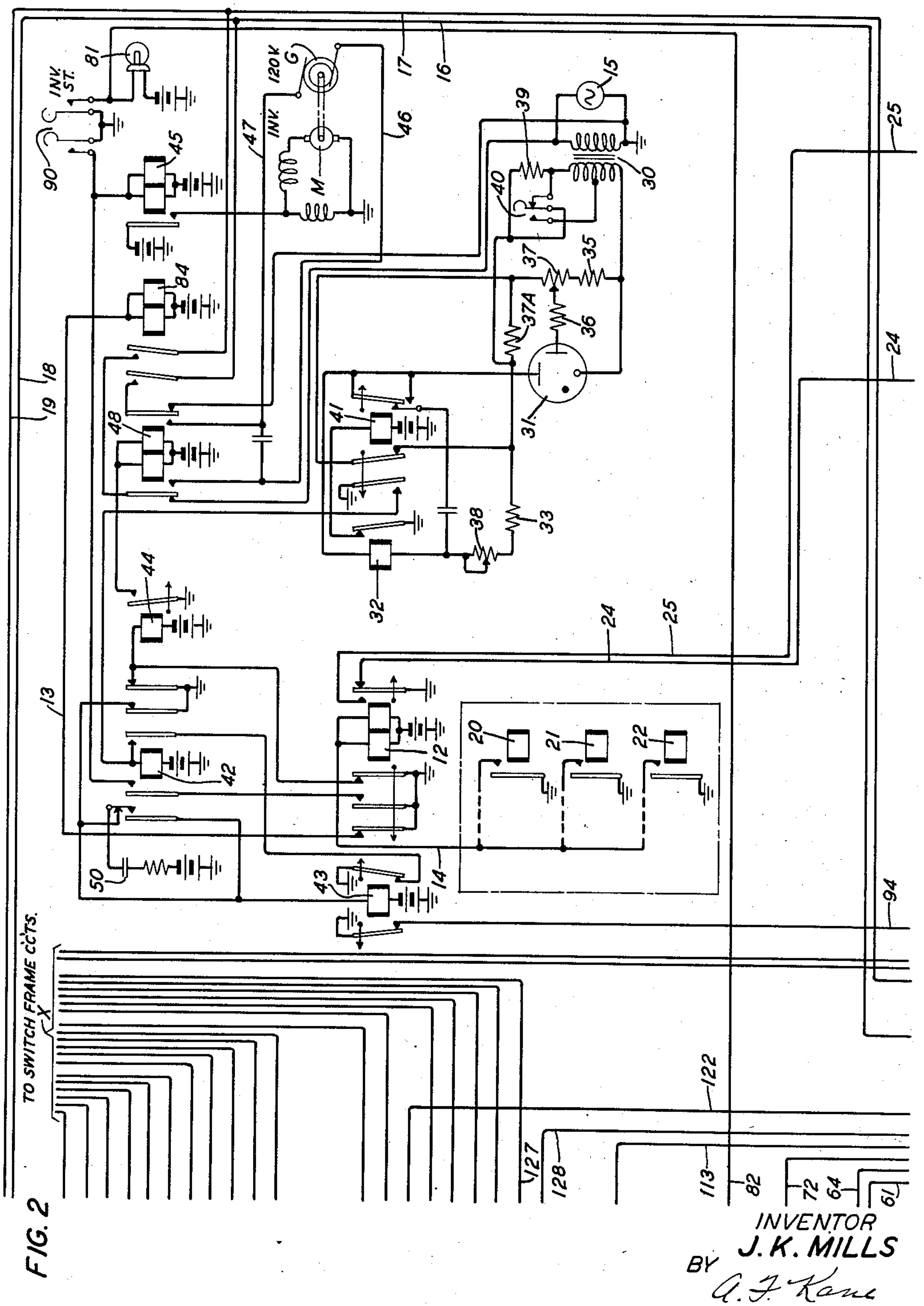
Figure 3:
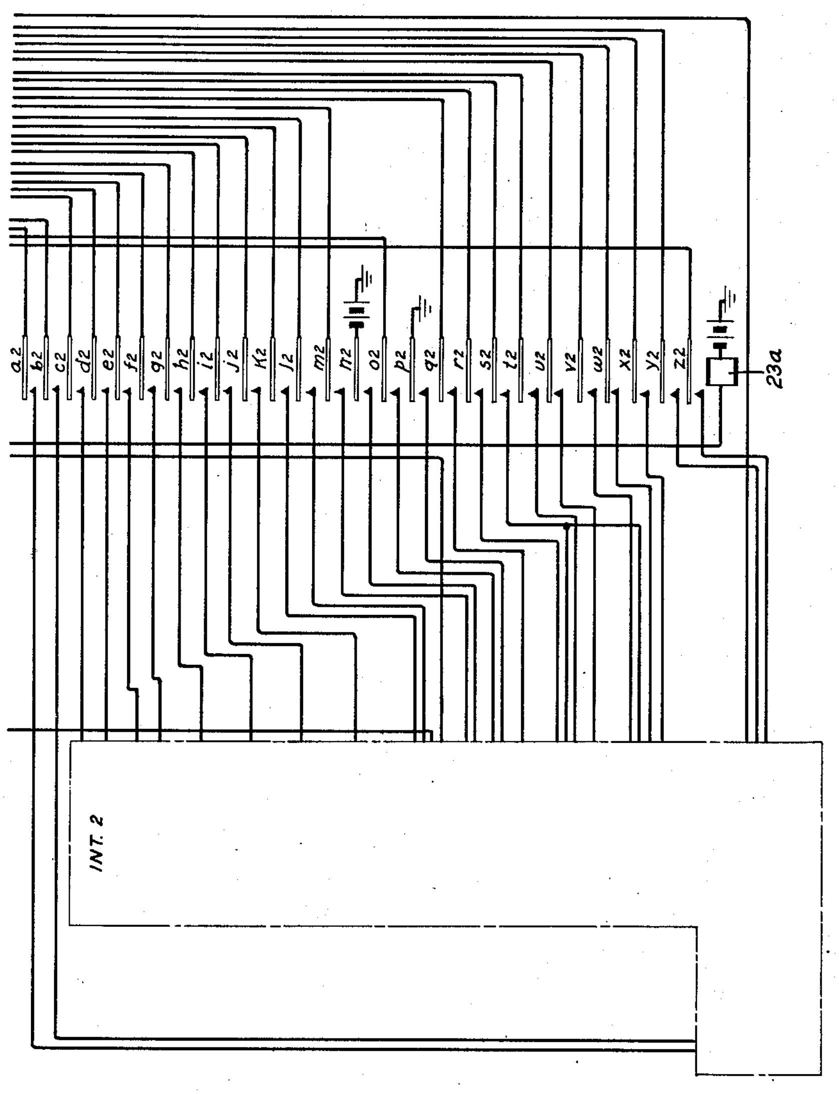

Referring to Figs. 1 and 3, the apparatus enclosed within the broken line box and designated INT1 in Fig. 1 represents a motor driven interrupter which is revolved at the rate of one revolution every six seconds by means of a motor M1 operating through a reduction gearing indicated at 99. The slow speed shaft 100 of interrupter INT1 has fixedly mounted thereon a series of cams 1–11 each of which controls an individual set of contact springs or spring pile-ups. Similar equipment is contained, but not illustrated, in the broken line box designated INT2 of Fig. 3. This latter equipment constitutes what is hereinafter referred to as the spare or secondary interrupter whereas that shown in Fig. 1 is characterized as the regular or primary interrupter. Two relays 23 and 23*a* are shown, the former in Fig. 1 controlling a multiplicity of armatures and their associated back contacts and the latter, in Fig. 3, controlling a corresponding number of armatures and their front contacts. These armatures serve to connect the output conductors of the interrupters INT1 and INT2 to the "switch frame circuits" X indicated in the upper left section of Fig. 2. It will be understood that the armature load, in practice, is distributed among a greater number of relays such as relays 23 and 23*a*, but the drawing is limited to two such relays for simplicity of disclosure. The lower right portion of Fig. 1 includes apparatus which is involved in the transfer of the exchange load from one interrupter to the other.

Fig. 2 discloses circuits and apparatus having to do particularly with the manner in which the ringing supply equipment is started functioning upon demand by the exchange equipment, and illustrates a motor-generator set hereinafter referred to as inverter INV which is automatically brought into service in the event of failure of the regular service supply 15 under control of a voltage control circuit involving vacuum tube 31. This latter control circuit, of itself, constitutes no part of the present invention; it is disclosed in United States Patent 2,197,868, issued April 23, 1940, to C. S. Knowlton. Relays 20, 21 and 22 represent those relays of a line finder, selector and connector, respectively, which operate at various stages of a telephone connection to initiate the operation of the ringing supply equipment and to maintain it operating.

Figure 4:
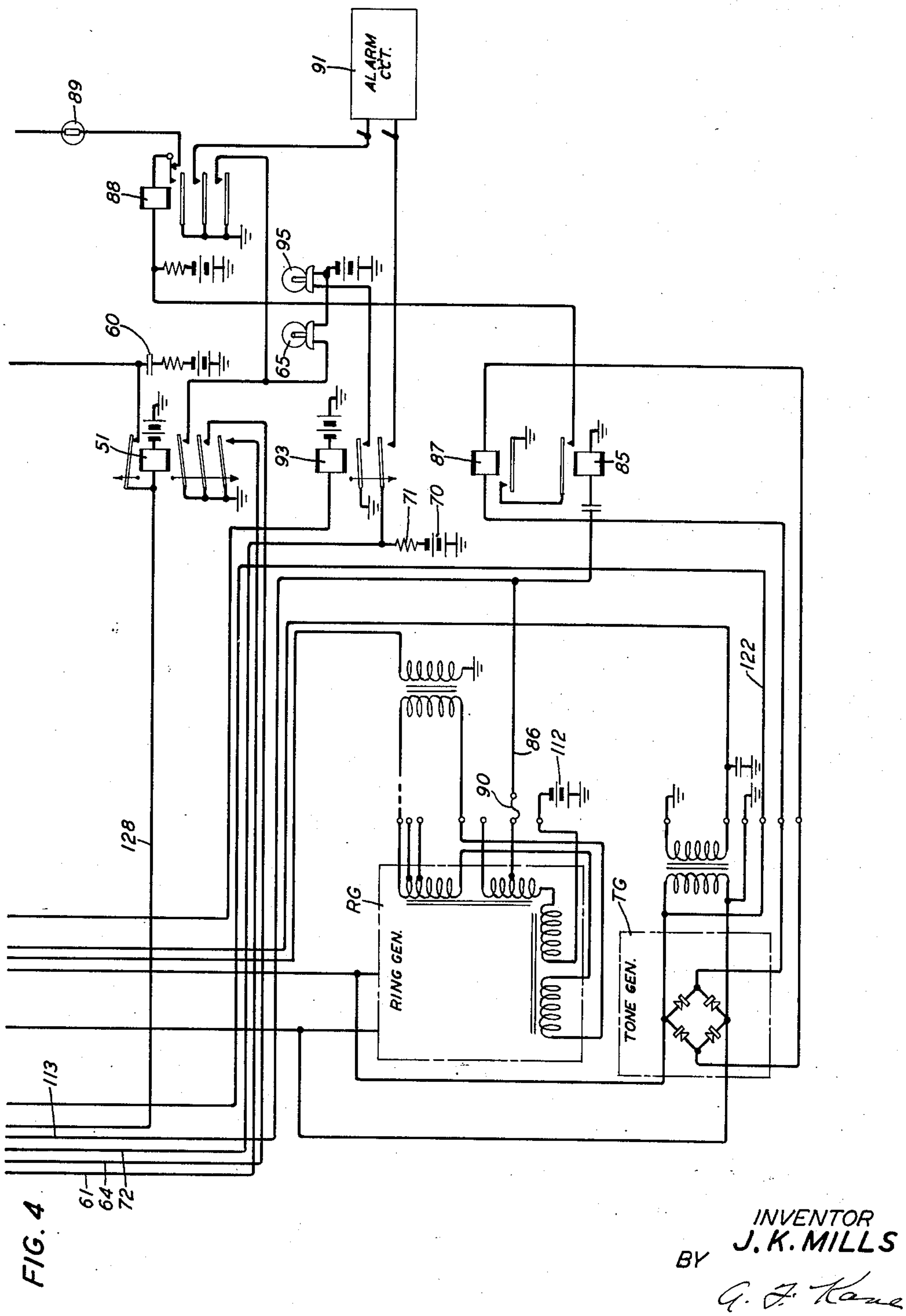

Fig. 4 shows a ringing generator RG and a tone generator TG, neither of which, in itself, constitutes a part of the present invention. They are static frequency converters of any suitable design, the tone generator preferably being of the general type disclosed in United States Patent 2,277,809, issued March 31, 1942, to L. R. Wrathall. Fig. 4 also shows relay 51 which is maintained operated, while the shaft 100 of the primary interrupter revolves, under control of cam 11 of interrupter INT1 and condenser 55 (Fig. 1), and which responds to the failure of this interrupter to revolve to effect a transfer of the load from interrupter INT1 to interrupter INT2.

The interrupters INT1 and INT2 are identical and, by way of illustration, are shown to include eleven spring pile-ups and their associated cams 1 to 11, inclusive. It is to be understood that the cams and spring pile-ups may be fewer or greater in number than eleven and may take forms other than those shown depending upon the requirements of the telephone exchange to be met.

Interrupter springs 1*a* function under control of the corresponding cam 1 to apply ground potential at 57 to conductor 101 for a period of one and one-half seconds for each complete cycle of six seconds and, during the same interval, to apply superimposed battery from battery 112 (Fig. 4) and ringing current from the output of generator RG to conductor 102 by way of conductors 86 and 113; during the balance of the six-second period, or for four and one-half seconds battery 114 (Fig. 1) is connected to conductor 102 by way of the armature *n1* and the associated back contact of relay 23; conductors 115 and 116 and the back contact and armature *d1* of relay 23.

Interrupter springs 2*a* function under control of the associated cam 2 to supply two spurts of ground potential, each of one and one-half seconds' duration spaced by an interval of one-half second, to conductor 103 during each complete cycle; during the same intervals superimposed battery 112 (Fig. 4) and ringing current from generator RG are supplied to conductor 104 by way of conductors 86, 113 and 117 and the back contact and armature *f*1 of relay 23; during the remaining two and one-half seconds of the cycle battery 114 (Fig. 1) is connected to conductor 104 by way of armature *n*1 and the associated back contact of relay 23, conductors 115 and 116 and the back contact and armature *f*1 of relay 23.

Interrupter cam 3 and its associated springs 3*a* cooperate to apply to conductor 105, by way of armature *g*1 and the associated back contact of relay 23, two spurts of ground potential during each complete cycle, the first spurt being of a duration of one and one-half seconds and spaced one-half second from the second spurt which is of one-half second duration; during the remaining three and one-half seconds conductor 105 is held open.

Interrupter cam 4 and its associated springs 4*a* function to apply to conductor 106, by way of the back contact and armature *h*1 of relay 23, three spurts of ground potential during each complete cycle, one of one and one-half seconds' duration and each of the other two of one-half second duration with one-half second interval between spurts; during the remaining two and one-half seconds conductor 106 is held open.

Interrupter cam 5 and its associated contact springs 5*a* function to apply to conductor 107, by way of the back contact and armature *i*1, three spurts of ground potential, the first of one and one-half seconds' duration and spaced one-half second from the second spurt which is of one-half second duration and, in turn, spaced one-half second from the third spurt which is of one and one-half seconds' duration; during the remaining one and one-half seconds conductor 107 is held open.

Interrupter cam 6 and its associated contact springs 6*a* function to apply to conductor 108, by way of the back contact and armature *j*1 of relay 23, two spurts of ground potential each of one-half second duration and spaced by a time interval of two and one-half seconds.

Certain of the functions of cam 7 and its associated springs 7*a* appear from the description of the operation of the system to be made hereinafter. It is apparent that the springs controlled by cam 7 are operated for but one-half second in each cycle. It is also apparent that for one-half second of the cycle ground at 57 is connected to conductor 109 by way of armature *k*1 and the associated back contact of relay 23 and for the remaining four and one-half seconds of the cycle conductor 109 is connected to conductor 110 over armatures *k*1 and *l*1 of relay 23 and their respective back contacts.

Interrupter cam 8 and its contact springs 8*a* serve to apply to conductor 120, superimposed battery 112 (Fig. 4) and ringing current from source RG for an interval of one and one-half seconds during each cycle, this circuit involving conductors 86 and 113 and armature *g*1 and the associated contact of relay 23; during the remaining four and one-half seconds' interval of the cycle conductor 120 is connected to battery 114 by way of armatures *g*1 and *n*1 and the associated back contacts of relay 23.

The interrupter springs 9*a* controlled by cam 9 operate and release alternately six times during one complete cycle, each operation and release interval consuming one-half second. During the intervals in which the springs are operated low tone is connected to conductor 121 in a circuit traced from the low tone source or tone generator TG (Fig. 4), over conductor 122, armature *s*1 and associated back contact of relay 23, interrupter spring contacts and armature and back contact of relay 23; also during the same intervals ground at 57 is connected to conductor 123 by way of the interrupter spring contacts and the back contact and armature *t*1 of relay 23. During the alternate intervals ground at 57 is connected to conductor 124 by way of the interrupter spring contacts and the back contact and armature *u*1 of relay 23.

Interrupter cam 10 interrupts its associated contact springs 10*a* at the rate of one hundred twenty times a minute causing low tone from the source TG to be applied at the same rate to conductor 125, the path from the tone source including conductor 122, armature 31 and back contact of relay 23, interrupter spring contacts, and the back contact and armature *v*1 of relay 23; similarly, ground at 57 is applied at the same rate to conductors 126 and 127 by way of the interrupter spring contacts and the back contacts and armatures *w*1 and *x*1 of relay 23, it being apparent that when ground is being applied to one of the conductors 126 or 127 it is being disconnected from the other conductor.

The interrupter cam 11 operates its spring pile-ups at the rate of one hundred and twenty times per minute to alternately connect the condenser 55 to ground and to one terminal of the winding of relay 51 for a purpose to be set forth in greater detail hereinafter.

*Normal operation*

In normal operation and when no telephone calls are in progress, "start" relay 84 (Fig. 2) is held operated in a circuit extending from grounded battery, windings of relay 84, conductor 13, outermost left back contact and corresponding armature of relay 12 to ground. Under this condition the ringing and tone generators and the interrupters are inactive. When ringing current, tones or ground pulses are required by the switching circuits at the exchange, ground potential is connected to conductor 14 in a manner to be described presently. It will be understood, for the purpose of this description, that the ringing equipment illustrated is associated with a so-called community dial office or automatic exchange of the step-by-step type and that the designations 20, 21 and 22, as hereinbefore indicated, represent well-known relays present in such an exchange which are operated in response to the origination of a telephone call and to subsequent steps incident to the completion of a telephone connection.

Upon the initiation of a call at the dial exchange the above referred to relay 20 in the line finder operates to start the finder in search for the calling line as is well understood in the art. In operating, relay 20 connects ground to the "machine start" conductor 14 which causes relay 12 to operate in an obvious circuit. This ground on conductor 14 is maintained by other relays 21 and 22 in the selector and connector, respectively, as the call progresses and is not removed until the called subscriber answers or the call is abandoned.

Relay 12, operated, opens the operating circuit for relay 84 causing relay 84 to release. At its two armatures and back contacts relay 84 completes connections from the alternating-current service supply 15 to the ringing and tone generators RG and TG, respectively, by way of conductors 16 and 17 and to the interrupter INT1 by way of conductors 18 and 19, it being observed that, at this time, relays 23 and 23*a* are assumed to be in their unoperated conditions as illustrated, so that conductors 18 and 19 are extended to the motor M1 by way of the armatures *a*1 and *b*1 and their associated back contacts, whereas the path of these same supply conductors 18 and 19 to the motor of interrupter INT2 is open at armatures *a*2 and *b*2 and the associated front contacts of relay 23*a*.

Relay 12 at its right armature and back contact removes ground from conductor 24 and at the corresponding front contact connects ground to conductor 25 for a purpose to be set forth hereinafter.

Interrupter INT1 functions under control of motor M1 and together with ringing generator RG and tone generator TG make available to the exchange circuits by way of conductors X machine ringing, tones and other code signals as required.

When ringing current, tones, etc. are no longer required ground is removed from conductor 14 causing relay 12 to release. Upon restoring its armatures relay 12 causes relay 84 to reoperate to disconnect the alternating current service supply 15 from the ringing and tone generators and from motor M1 of the interrupter INT1.

*Automatic transfer to inverter INV on power service failure*

Transformer 30 (Fig. 2), tube 31, relay 32 and resistances and potentiometers 33, 34, 35, 36, 37, 37A and 38 form a circuit which is adjusted to cause relay 32 to release when the voltage of the local service source 15 is approximately eighty-five per cent of normal value. Resistance 39 is provided to prevent release of relay 32 during the open period of the contact of the adjusting key 40 when the key is being operated. Under normal voltage conditions at source 15 the voltage applied to the control gap of tube 31 is sufficient to cause this gap to fire on each half cycle. This causes the main gap to fire and furnish current for the operation of relay 32. Relay 32, operated, maintains slow-to-release relay 41 operated.

When the power service voltage at source 15 falls below eighty-five per cent of normal the control gap of tube 31 will not have sufficient voltage across it and will cease to fire as will also the main gap with the result that relay 32 releases, in turn releasing relay 41.

At its inner left armature relay 41 opens a short circuit across resistance 37A in the control gap potentiometer so that tube 31 will fire at a voltage about five per cent above the release voltage. At its outer left armature relay 41 completes an obvious energizing circuit for relay 42 which relay thereupon operates and locks to ground by way of its own front contact and innermost right armature and the right front contact and associated armature of relay 43. Relay 43 is normally held operated in a circuit to ground at the back contact and middle right armature of relay 42.

Relay 42, at its outermost right armature and back contact removes ground from the winding of relay 44, which relay remains operated to ground at the back contact and innermost left armature of relay 12. At its inner left armature and front contact relay 42 prepares an operating circuit for relay 45 which circuit is open at the front contact and middle left armature of relay 12 so that whenever relay 12 operates incident to the operation of such telephone switching relays 20, 21 and 22, relay 45 will operate and start the inverter INV. The inverter is started by the connection of grounded battery at the armature and front contact of relay 45 to the field windings of the direct-current motor M which motor drives the alternating-current generator G in well-known manner.

The output leads 46 and 47 of generator G are connected to the two front contacts of relay 48, which relay remains released until relay 44 restores its armature incident to the operation of relay 12 which occurs when relays such as 20, 21 and 22 operate to indicate the need for ringing and tone currents on the telephone switching circuits.

When relay 12 operates under control of such relays as 20, 21 and 22, relay 44 is released and causes the completion of an obvious operating circuit for relay 48. With relay 12 operated, relay 84 is released and the output leads from generator G are substituted for corresponding leads of the power service supply 15 so that the alternating-current load is now taken over by generator G.

Relay 44 is made slow-releasing in order to delay the load transfer until the inverter INV has attained full speed. Relay 42, operated, removes ground from the winding of relay 43 so that when the condenser 59 has discharged, relay 43 will release. This condenser discharge delays the release of relay 43 for a minimum of thirty seconds so that when once operated, relay 44 will not release for this period of time even though relays 32 and 41 have reoperated during this period. The purpose of the delay is to prevent unnecessary transfers back to the main power service during momentary restorals of service voltage after a service failure.

*Interrupter transfer-automatic*

When there is no ground on conductor 14 interrupter INT1 is not operating and ground at the right armature and back contact of relay 12 is connected over conductor 24 to the winding of relay 51 (Fig. 4) holding this relay operated. When relay 12 (Fig. 2) is operated, the holding ground for relay 51 is removed but if the interrupter is running relay 51 is held operated in the following manner: With interrupter INT1 operating, the lowermost cam 11, together with the other cams illustrated, is driven by motor M1 and being designed to interrupt the associated spring contacts at the rate of 120 interruptions per minute alternately connects condenser 55 and the series resistance 56 (Fig. 1) to ground at 57 and to the winding of relay 51 over conductors 58 and 59 and 128 by way of the back contacts and armatures *z*1 and *y*1 of relay 23 at the same rate. This periodic connection of condenser 55 to the winding of relay 51 maintains relay 51 operated while the condenser is charging and the slow-release characteristic of the relay when in parallel with condenser 60 prevents it from releasing during the interval when condenser 55 is being discharged to ground at 57.

Should the motor M1 which is driving the interrupter INT1 fail or should the interrupter shaft 100 cease to turn for any reason, such as gear train failure, the 120 I. P. M. spring pile-up controlled by cam 11 stops in either of two positions. If it stops when condenser 55 is connected to the winding of relay 51, the relay will remain operated until the charging current falls below the value of the relay holding current. If the interrupter stops with the conductor 59 extending to the winding of relay 51 open, the relay will release after a short delay due to the parallel connected condenser 60.

Relay 51, released, connects ground at its outermost lower armature and back contact over conductor 61 to a winding terminal of relay 62 causing relay 62 to operate. At its middle lower armature and back contact relay 51 connects ground to thermistor 63 by way of conductor 64. At its innermost lower armature and front contact relay 51 completes an obvious energizing circuit for lamp 65.

Relay 62 (Fig. 1) operated, locks to ground at the contact of key 66 by way of its own front contact and inner upper armature, the outer left armature and back contact of relay 67 and conductor 68. At its outer upper armature and front contact relay 62 completes an obvious energizing circuit for lamp 69 and equally obvious operating circuits for relays 23 and 23*a*. Relay 62, at its inner lower armature connects battery 70 (Fig. 4) by way of resistance 71, conductor 72 and normally closed contacts on key 66 to the alarm circuit 74 to bring in a minor alarm. At its outer lower armature relay 62 extends the ground at the middle lower armature and contact of relay 51 over conductor 64 and thermistor 63 to the alarm circuit 74. However, the delay introduced by thermistor 63 is sufficiently long so that relay 51 (Fig. 2) reoperates from the second, or spare interrupter INT2, removing ground from thermistor 63 before the alarm indicating a major trouble is brought in. In case of failure of the spare interrupter, relay 51 will again release and remain released and ground will be connected to thermistor 63 to bring in a major alarm.

With relays 23 and 23*a* operated, as described, all the conductors controlled by the former relay are open and the corresponding leads controlled by the latter are connected to the interrupter INT2. At armatures *a*1 and *b*1 of relay 23 the power leads 18 and 19 from the service supply 15 are disconnected from the motor M1 of interrupter INT1 and are extended to the motor of the spare interrupter INT2 by way of armatures *a*2 and *b*2 and the corresponding front contacts of relay 23*a*. Thus, with relays 23 and 23*a* operated, the spare interrupter INT2 is started, or conditioned to start upon the operation of relay 12 (Fig. 2), and the load is transferred from interrupter INT1 to the spare interrupter INT2.

When interrupter INT1, which has failed, has been made ready for service again it should be turned manually to a position in which the springs controlled by cam 1 thereof operates its associated springs and cam 8 thereof does not operate its associated springs. This precaution is taken to prevent splitting ringing codes during a manual transfer.

To restore interrupter INT1 to service key 66 is operated and held operated until relay 62 restores its armatures and extinguishes the lamp 69. When key 66 is operated it removes locking ground from relay 62 but a parallel ground is provided for holding relay 62 operated until a certain point in the rotational cycle is reached. This parallel holding circuit may be traced from grounded battery, through the winding of relay 62, its front contact and inner upper armature, outer left armature and back contact of relay 67, conductor 68, armature O2 and front contact of relay 23*a*, upper contacts of the spring pile-up controlled by cam 8 of the spare interrupter INT2, front contact and armature P2 of relay 23*a*. When the interrupter INT2 reaches the end of its code cycle these contacts will be open causing relay 62 to restore its armatures.

Relay 62, released, extinguishes the lamp 69, and opens the leads to the alarm circuit 74. It also releases relays 23 and 23*a* which function, as is now apparent, to transfer the load back to interrupter INT1, to open the motor circuit of interrupter INT2 and to close the motor circuit of interrupter INT1.

*Interrupter transfer—manual*

To manually transfer the load from interrupter INT1 to interrupter INT2, key 80 is operated to complete an obvious operating circuit for relay 67 which relay operates and locks by way of its innermost right armature and front contact in an obvious circuit to ground at key 66. At its middle right armature and front contact relay 67 completes an energizing circuit for guard lamp 81 over conductor 82 and at its inner left armature and front contact it connects ground over conductor 83 to the lower spring contacts controlled by cam 7 of interrupter INT1. When the interrupter reaches the end of the code cycle the contacts just mentioned close, connecting ground to the winding of relay 62. Relay 62 operates and locks up to ground at the outer left armature and front contact of relay 67. Relay 62 then effects the load transfer from interrupter INT1 to interrupter INT2 and the start of interrupter INT2 in the manner hereinbefore described.

With relay 67 operated, no alarms are brought in as conductor 72 is open at the outermost right armature and back contact of relay 67. Transfer is effected at the end of the code cycle to prevent garbling of the codes.

To transfer back to interrupter INT1 key 66 is operated and held operated until relays 67 and 62 release and lamp 69 is extinguished. Holding ground is connected from interrupter INT2 to relay 67 until the end of the code cycle in the manner described in connection with the holding of relay 62 under "Interrupter transfer—automatic." At that time relay 67 releases, causing relay 62 to release which starts interrupter INT1 and transfers the load thereto and stops interrupter INT2. Lead 72 is opened temporarily by contacts on key 66 thus preventing a false minor alarm during the release time of relay 62.

*Alarms*

Relay 85 (Fig. 4) is connected to the alternating-current-direct-current audible or superimposed audible output of the ringing generator RG by way of conductor 86 and relay 87 is connected to the direct-current output of the tone generator TG. Ground is connected in series through the contacts of these relays to relay 88 which keeps relay 88 shunted down while the plant is operating, it being noted that while the plant is operating relay 12 is operated and connects ground to the other terminal of relay 88 by way of conductor 25, thermistor 89 and the normally closed make-before-break contacts of relay 88. If the output of the ringing or tone generators fails or fuse 90 is blown, either relay 87 or relay 85 will release and remove the shunting ground allowing relay 88 to operate through thermistor 89 after a delay of approximately two seconds. Relay 88, operated, lights lamp 65 and brings in a major alarm in the alarm circuit 91. When relay 88 operates it remains operated over its innermost armature and front contact to ground, thus locking in the alarm until the trouble has been corrected regardless of the presence or absence of ground on conductor 14.

In case of power failure as described hereinbefore, relay 43 releases after a predetermined delay and removes ground from the operating circuit to relay 93 which circuit includes conductor 94, causing relay 93 to release. Relay 93 at its inner armature and back contact lights the lamp 95 and at its outer armature brings in a minor alarm in the alarm circuit 91. Should the power be restored before relay 43 has released, relay 43 will release momentarily at the end of its delay, releasing relay 42 which in turn reoperates relay 43. Relay 93, Fig. 4, being slow releasing will hold up during this interval to prevent a momentary alarm.

*Manual start of inverter*

The inverter INV (Fig. 2) may be started manually by operating the "inverter start" key 90. This causes relay 45 to operate in an obvious circuit and causes lamp 81 to be lighted as a guard or warning signal. While the operation of key 90 functions to start the inverter, it does not effect the connection of the load to it.

What is claimed is:

1. In a ringing current supply system for telephone exchanges involving signal current generators, an exchange load, primary and secondary interrupters for rendering available to said load the outputs of said generators in various code combinations, each of said interrupters comprising a revolvable shaft, means responsive to the initiation of an exchange connection to energize said generators and to start the shaft of said primary interrupter revolving whereby said primary interrupter operates to supply said load from said generators, switching means for transferring the exchange load from the primary interrupter to the secondary interrupter, relay means for detecting the revolution of the shaft of said primary interrupter, and means controlled by said detecting means for controlling said switching means.

2. In a ringing current supply system for telephone exchanges involving signal current generators, an exchange load, primary and secondary interrupters for rendering available to said load the outputs of said generators in various code combinations, each of said interrupters comprising a revolvable shaft, means responsive to the initiation of an exchange connection to energize said generators and to start the shaft of said primary interrupter revolving whereby said primary interrupter operates to supply said load from said generators, switching means for transferring the exchange load from the primary interrupter to the secondary interrupter, a relay, means controlled directly by the shaft of said primary interrupter while said shaft revolves for maintaining said relay operated, and means controlled by said relay when released for operating said switching means.

3. In a ringing current supply system for telephone exchanges involving signal current generators, an exchange load, primary and secondary interrupters for rendering available to said load the outputs of said generators in various code combinations, each of said interrupters comprising a revolvable shaft, means responsive to the initiation of an exchange connection to energize said generators and to start the shaft of said primary interrupter revolving whereby said primary interrupter operates to supply said load from said generators, switching means for transferring the exchange load from the primary interrupter to the secondary interrupter, a relay having one winding terminal connected to ground potential by way of a battery, a condenser, means controlled by the shaft of said primary interrupter for alternately connecting said condenser to the other terminal of said relay and to ground potential whereby said relay is operated on condenser charging current from said battery while said shaft is revolving, and means controlled by said relay when released for operating said switching means.

4. In a ringing current supply system for telephone exchanges involving signal current generators, an exchange load, primary and secondary interrupters for rendering available to said load the outputs of said generators, each of said interrupters comprising a revolvable shaft, means responsive to the initiation of an exchange connection to energize said generators and to start the shaft of said primary interrupter revolving whereby said primary interrupter operates to supply said load from said generators, switching means for transferring the exchange load from the primary interrupter to the secondary interrupter, a slow-release relay having one winding terminal connected to ground by way of a battery, a condenser connected in parallel with the winding of said relay by way of operated contacts of said relay, said condenser serving to maintain said relay operated during periodic opening of its operating circuit, a second condenser, means controlled by the shaft of said primary interrupter for periodically connecting said second condenser to the other terminal of said relay and alternately to ground potential, whereby said relay is operated, while the shaft of said primary interrupter revolves, on charging current to said second condenser and is held operated by said first condenser during the connection of said second condenser to ground potential, and means controlled by said relay when released for operating said switching means.

5. In a ringing current supply system for telephone exchanges involving current supply sources and duplicate interrupters and in which the current supply sources are energized from a local supply and each interrupter comprises a revolvable shaft driven by a motor powered from the same local supply, a load circuit, means responsive to a demand by said load circuit for connecting said current supply sources and the motor of one of said interrupters to the local supply whereupon the shaft of the said one of said interrupters is caused to revolve and the corresponding interrupter serves the load circuit to render available thereto current from said current supply sources, and switching means responsive to a stoppage of the shaft of the first interrupter during the application of power from said local supply to the motor of said first interrupter for disconnecting the motor of said first interrupter from said local supply and transferring said load circuit to the other of said duplicate interrupters.

6. In a ringing and signaling current supply system for telephone exchanges the combination of sources of ringing and signaling currents, a load circuit, a primary and a secondary interrupter for supplying current from said sources in code form and each having a rotatable shaft, a local source of power, a motor for driving the shaft of each of said interrupters, means responsive to a demand by said load circuit for connecting said current sources and the motor of said primary interrupter to said local source of power and said load circuit to said primary interrupter, switching means for transferring said load circuit to said secondary interrupter and the motor of said secondary interrupter to said local source of power, a relay having a non-operated condition in which it effects the operation of said switching means, and a ground to ground control circuit for said relay over which said relay is operated during the operation of said primary interrupter comprising a battery, the winding of said relay, contacts of said primary interrupter and a condenser, and means for periodically interrupting said circuit comprising a cam mounted on the shaft of said primary interrupter in cooperative association with said contacts.

References Cited in the file of this patent

UNITED STATES PATENTS

| Number | Name | Date |
|---|---|---|
| 1,762,811 | Charlton | June 10, 1930 |
| 2,049,376 | Hertwig et al. | July 28, 1936 |
| 2,349,182 | Lesnick | May 16, 1944 |
| 2,442,427 | Mullerheim | June 1, 1948 |
| 2,567,018 | Grob | Sept. 4, 1951 |